United States Patent [19]

Chase

[11] 4,091,747
[45] May 30, 1978

[54] WASTE INCINERATOR SYSTEM

[75] Inventor: Charles Edgar Chase, Mississauga, Canada

[73] Assignee: Trecan Ltd., Canada

[21] Appl. No.: 668,918

[22] Filed: Mar. 22, 1976

[30] Foreign Application Priority Data

Jan. 7, 1976 Canada .................................. 243102

[51] Int. Cl.² .......................... F23G 5/12; F23L 9/04; F23L 9/06
[52] U.S. Cl. .................................. 110/210; 110/297; 110/119
[58] Field of Search .............. 110/7 R, 8 R, 8 A, 8 C, 110/18 R, 18 C, 119, 72 R, 75 R

[56] References Cited

U.S. PATENT DOCUMENTS

| | | | |
|---|---|---|---|
| 3,218,997 | 11/1965 | Berghout | 110/18 |
| 3,354,847 | 11/1967 | Clement et al. | 110/7 |
| 3,675,600 | 7/1972 | Jones | 110/8 |
| 3,678,869 | 7/1972 | Bowman | 110/8 |

Primary Examiner—Kenneth W. Sprague
Attorney, Agent, or Firm—Stevens, Davis, Miller & Mosher

[57] ABSTRACT

A waste incinerator system, particularly suitable for bulk waste contaminated with radioactivity, is provided with a primary, upright combustion chamber with a removable, frusto-conical bottom section. The chamber is of the type having a double shell with cooling air passage therethrough. The cooling air is introduced at two different, vertically spaced levels, whereby the temperature control of the double shell can be effected by selectively controlling the volume of air incoming at the two levels. Only the bottom, frusto-conical removable portion of the combustion chamber is provided with refractory lining, the remainder of the chamber having a heat resistant steel inside wall, whereby the build-up of radioactivity levels within the chamber is reduced. The refractory of the frusto-conical bottom portion of the chamber is replaceable.

9 Claims, 2 Drawing Figures

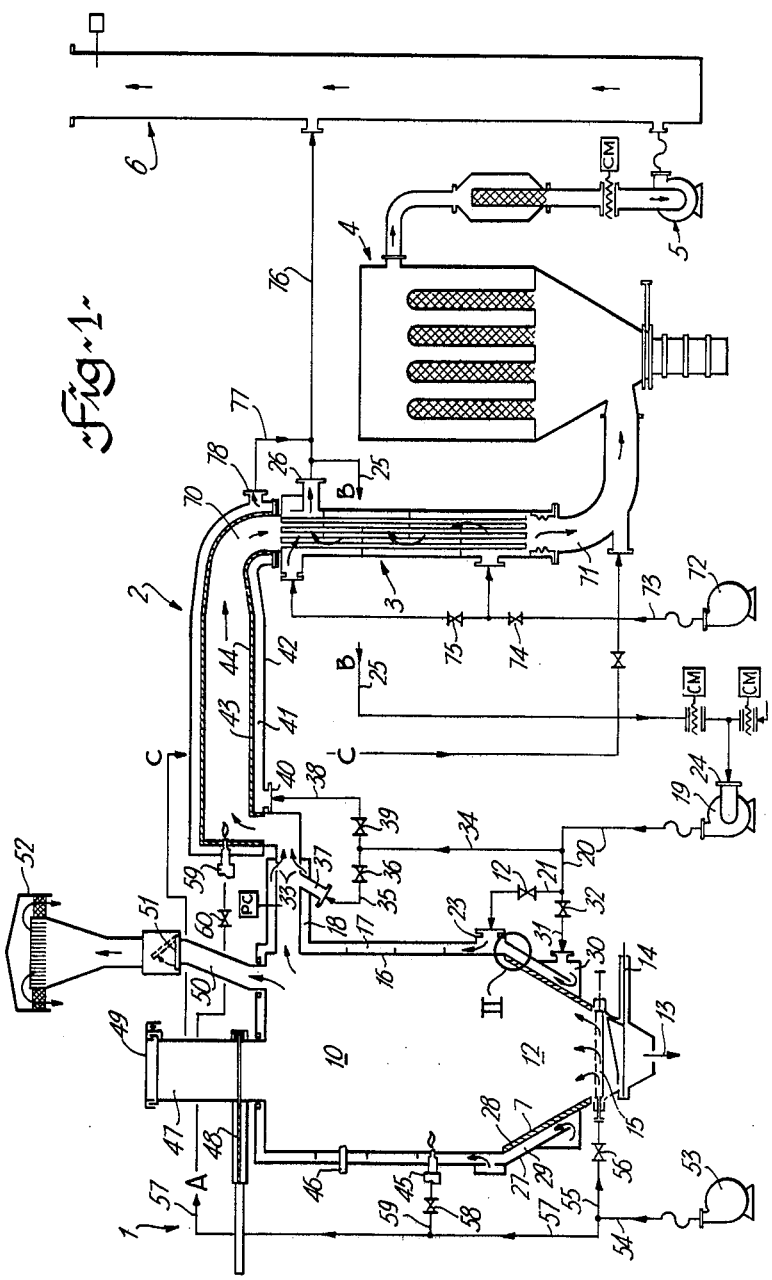

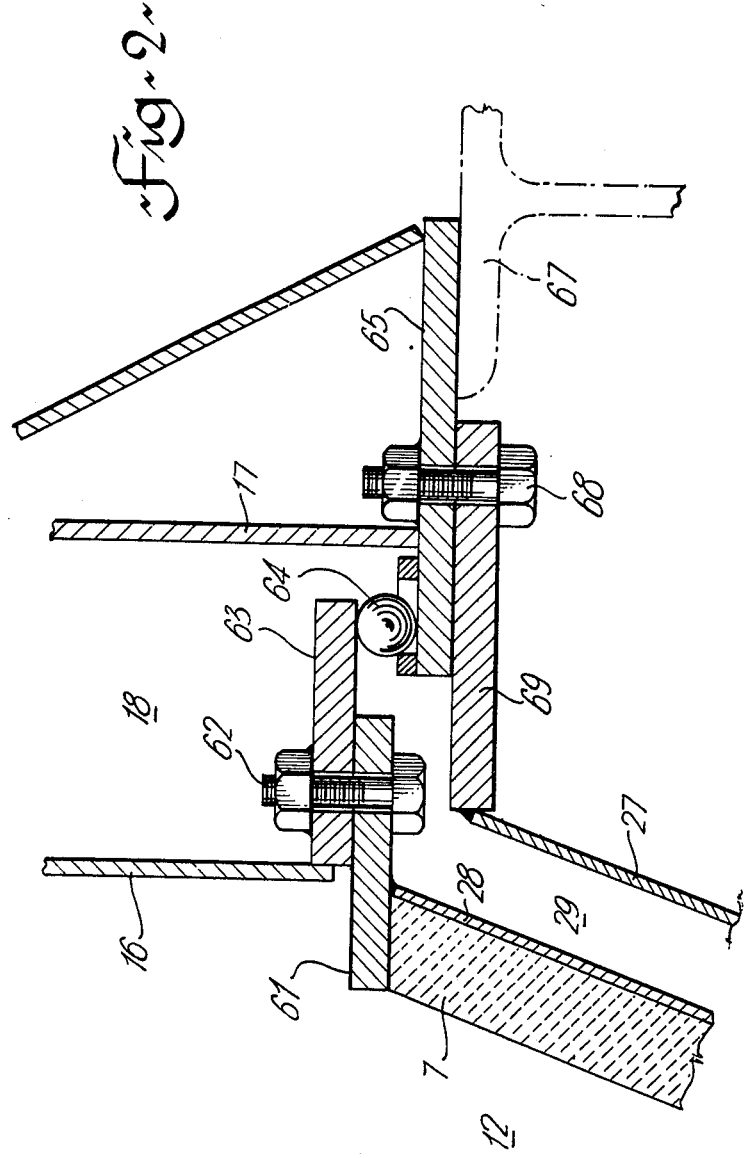

WASTE INCINERATOR SYSTEM

The present invention relates to a waste incinerator system of the type having a primary combustion chamber, an afterburner, a heat exchanger, and subsequent fly ash filtering means.

Bulk or generally solid waste contaminated with radioactivity is presently placed in concrete structures for safe storage.

Incineration of such radioactive waste has thus far been relatively difficult to effect due to a relatively high environmental hazard of such processing. On the other hand, incineration is desirable as it reduces the volume of the waste by over 90%, thus substantially reducing the required volume for storage. Incineration is also desirable as its final product is more uniform and more adapted for better isolation from the environment.

The known incinerators can, basically, be divided into two groups. The first group has a combustion chamber lined with heavy refractory. This type of incinerator is disadvantageous for use in processing waste partly contaminated with radioactivity as the porous refractory material builds up radioactivity levels too rapidly due to the porosity of the material. Moreover, the refractory material of known incinerators is difficult to decontaminate. The second group of incinerators provides a multiple shell wall of the incinerator, such as disclosed in U.S. Pat. No. 3,861,330, issued to Santoleri. This type of incinerator is used for burning aqueous waste material such as sewage sludge and includes a horizontal cylindrical incinerator chamber having concentric metal shells with means between the shells to direct flow of cooling air and to contain insulation at selected locations, to maintain a relatively uniform temperature along the inner shell and to keep the outer shell cool. Although this multiple shell incinerator meets the requirements of reduced overall weight of the device, it still includes a substantial volume of porous insulation material which would render the use of such incinerator virtually impossible for waste contaminated with radioactivity. Moreover there is a relatively vigorous turbulence generated inside the chamber, which is desirable in processing liquid waste, but totally unacceptable in incinerating solid waste, particularly radioactive solid waste, as the turbulence would unavoidably result in a relatively high volume of radioactive fly ash to be removed by known methods. The latter type of incinerator, therefore, is not only totally unsuitable for processing solid waste but, moreover, would pose a serious environmental hazard if used for processing waste contaminated with radioactivity.

It is an object of the present invention to provide an incinerator system, the primary incinerator chamber of which is capable of operating under the "controlled air" concept by starving the air quantity in the primary chamber to obtain a partially oxidized effluent consisting of CO, $CO_2$, $H_2$, $N_2$ and water vapour. One of the requirements of such operation is an effective control of the temperature of the inside wall of the combustion chamber and it is an object of the present invention to provide an arrangement that is relatively simple in structure and yet provides for an effective control of the temperature of the inside wall of the combustion chamber. In other words, the object of the invention is to provide an incinerator suitable for operation whereby the air flow into the chamber is limited to approximately 30% of the air required for complete oxidization. This results in a gentle air flow through the combustion chamber which, in turn, results in most of the ash remaining in the incinerator chamber whereby the volume of fly ash escaping from the combustion chamber is substantially reduced.

According to the invention, a waste incinerator system is provided which includes a primary incinerator chamber with pressure relief, afterburner, heat exchanger for cooling the afterburner effluent, bag house collector, a final filter and a stack, along with controls and auxiliaries required for operation of the system. The system includes a primary combustion chamber which is arranged for receiving a batch of relatively solid waste and which communicates, by means of a flue outlet, with the afterburner. The combustion chamber is of the type of an upright, generally cylindrical vessel having a heat resistant metal inner shell and a metal outer shell, the shells being arranged so as to provide an intermediate space for passage of temperature control air through the intermediate space. The combustion chamber is provided with a downwardly converging, removable, frusto-conical bottom section, the lowermost end of which terminates at ash outlet means. Means are provided for introducing temperature control air into the intermediate space, the means being disposed at at least two different levels vertically spaced from each other, to selectively control the temperature of said shells, and more particularly the temperature of the inner wall of the combustion chamber. At the upper end of the combustion chamber is provided means for discharging the air passing through the intermediate space into the flue outlet, to eventually enter the afterburner and subsequent portions of the overall system.

The invention will now be disclosed in greater detail with reference to the accompanying drawings in which FIG. 1 shows a simplified flow schematic of a system including the features of the present invention; FIG. 2 is a simplified detail II of FIG. 1.

As mentioned above, the system according to the present invention is intended for use in incinerating generally solid waste, i.e., a mixture of solid waste and liquid waste as referred to hereinafter.

The solid waste component of the mixture consists of contaminated paper, wood, cardboard, wet mops, rags, rubber gloves, plastics etc., and is similar to the Incinerator Institute of America type "O" Waste Classification or to CSA classes A, B, D & E. Plastic and rubber components are principally PVC, polyethylene and neoprene. The waste is normally not segregated at the source and can contain a significant quality of incombustible solid in the form of bottles, cans, wire, tubing, piping fittings, etc. The waste composition varies depending on prevailing conditions.

As a design criterion, the solid waste may comprise the following:

| | |
|---|---|
| Wt % Moisture: | 5 to 20 |
| Wt % Ash: | 10 to 20 |
| Wt % Combustible: | 85 to 60 |
| Average Density - lb/ft³: | 7 to 9 |
| Average Btu/lb - as received: | 7500 to 8500 |
| Max. Wt % Plastics: | 20 |
| Max. Wt % Halogenated: | ½ of plastics |

Waste is packaged in polyethylene bags with:

| | |
|---|---|
| Average volume: | 1½ - 2 ft.³ |
| Average weight: | 12 lb. |

| -continued | |
|---|---|
| Maximum weight: | 25 lb. |

Incombustibles having a maximum dimension greater than 12 in. are removed from bags before incineration.

The liquid waste is normally a mixture of organic solvents, oils and organic loop coolant (terphenyl). Chlorinated hydrocarbons such as trichloroethylene are also included in this waste.

As a design criterion the liquid organic waste may comprise the following:

| Wt % Combustible: | 75 to 100 |
|---|---|
| Wt % Water: | 25 to 0 |
| Specific Gravity: | .9 |
| Average Btu/lb: | 12,000 to 18,000 |
| Maximum % Halogenated: | |
| Average Viscosity: | 50 to 100 SSU |

Turning now to the drawing, it will be seen that a system is shown which uses a controlled air incinerator 1 with secondary clean-up equipment which is designed to reduce the radioactivity release to the atmosphere to below 0.03 millicuries per cycle.

Located downstream of the incinerator 1 is an afterburner 2 which communicates with a heat exchanger 3, the heat exchanger, in turn, communicating with a bag house 4, the clean side of which is operatively associated with an induced draft blower 5 of a stack 6. The incinerator 1 is capable of receiving an average volume of 300 cubic feet of solid waste as described above having average weight of 2,500 lbs., maximum weight being 3,000 lbs. The liquid waste charge per cycle is approximately 15 gallons (Imperial) and weighs about 135 lbs. The incinerator 1 includes a combustion chamber 10 communicating, by means of a flue outlet 11 with the afterburner 2. The combustion chamber 10 is of the type of a vertical cylindrical chamber with a downwardly converging frusto-conical bottom section or cone 12, the lower end of which terminates at an ash discharge 13. The ash discharge is provided with two ash discharge valves for securing a safe removal of radioactive ash. Only one such valve 14 is shown in the drawing, it being understood that the second valve could be located above or beneath the valve 14 to facilitate the containment of dust. The cone 12 further includes means for introducing combustion air, the means being of the type of a tiltable bottom plate 15, the upper wall of which is perforated to allow for passage of the primary air as shown.

The cylindrical chamber 10 is a double shell design comprising a stainless steel inner shell 16 and a steel outer shell 17. The shells 16 and 17 are arranged in a concentric fashion to provide an intermediate space 18 for passage of temperature control air through such space 18. The air introduced into the space 18 is supplied by an air blower 19 via a line 20, a branch 21, a control valve 22 and an annular air chamber 23 which surrounds the lowermost portion of the combustion chamber 10.

It will be observed that the intake 24 of the blower 19 communicates selectively with ambient air or, via a line 25, with a clean air hot exhaust 26 of the heat exchanger 3, so that the air used in the chamber 23 may be preheated before reaching the area of the inner shell 16. This particular feature keeps the shell temperature above the dew point of the controlled oxidation products and below serious scaling and oxidation temperature of the inner shell. The shell temperature, of course, is also maintained high enough to assure the completion of the controlled oxidation reaction during the processing of the waste.

It will be observed that the cone 12 section also consists of an outer shell 27, an inner shell 28 and a refractory lining 7, the lining 7 defining the inside wall of the cone 12. The outer shell 27 and the inner shell 28 define a space 29 for passage of air coming through an air chamber 30 communicating with the line 20 through a branch line 31 provided with a control valve 32. It will thus be appreciated that the air eventually entering the space 18 can be selectively admitted through the two air chambers 30, 23, depending on the adjustment of valves 22, 32.

The system of the blower 19 and of the associated air chambers is thus designed to introduce air into the intermediate space between the inside and outside shells of the incinerator at two levels spaced from each other in vertical direction. It will be observed that the intermediate space 18 extends up to the region of the flue outlet 11 to eventually discharge hot air through openings 33 into the flue outlet 11.

It will also be observed that the line 20 has a still further branch 34 which, at the flue outlet 11, divides into a line 35 with a control valve 36, the line 35 communicating with the flue outlet 11 through an inlet fixture 37. The other branch 38 of the end of branch 34 is also provided with a control valve 39 and communicates through an inlet fitting 40 with the inner space 41 of the after burner 2 which, as seen from FIG. 1, comprises an outer shell 42, and inner shell 43 and a refractory lining 44.

Turning back to the combustion chamber 10, the chamber is provided with three burners 45 (only one shown in FIG. 1) disposed at 120° centers in a horizontal plane. A waste oil inlet 46 is located above the level of the burners 45. The top of the combustion chamber 10 is provided with a loading chamber 47, the bottom of which is closeable by a slide valve 48, the top of the loading chamber 47 being provided with a sealable loading door 49.

The combustion chamber 10 also has an emergency pressure relief means consisting of a duct 50 provided with a pressure relief door 51 and with a capacitance cooler and filter assembly 52. Combustion air and primary air delivered through the bottom plate 15 is supplied by a blower 53 via a line 54, one branch 55 of which communicates, via a control valve 56 with the bottom plate 15. Another branch 57 communicates with the burners 45 through control valves 58 (only one shown in FIG. 1) included in lines 59. The branch 47 extends to the afterburner 2 to supply air to an ignition burner 59. A control valve 60 is included in the branch 57 for controlling the volume of air supplied to the burner 59.

As best seen from FIG. 2, the upper portion of the cone 12 terminates at a flange 61 which is secured, by peripherally disposed bolts 62 to another annular ring 63 resting on balls 64. The rollers 64 rest on another flange 65 which is supported by a beam 67 of the chamber supporting base structure. Secured to the flange 65 by means of a series of bolts 68 is another annular ring 69. It will be appreciated that on removing of the bolts 68, the ring 69 can be removed thus allowing access to the bolts 62 which, when loosened, allow for the removal of the complete cone section 12 when the radioactivity of the lining 7 exceeds predetermined values. The cone section at the bottom can thus be replaced upon build-up of radioactivity in the lining.

In operation, the waste is loaded through the loading chamber 47 at the top of the combustion chamber 10. The loading chamber is sized to hold 60 cubic feet of waste. Five loads for a total of 300 cubic feet of waste is the normal capacity of the combustion chamber 10. The unit is only loaded when the incinerator is not burning. During the loading, the incinerator is under negative pressure. The top loading door 49 can only be opened when the valve 48 is in a closed position thus effectively closing the chamber 47 off the chamber 10. After loading, the valve 48 is maintained in closed position and the loading door 49 is sealed. The afterburner 2 is preheated with the blower 72 in operation. Air re-circulated through the heat exchanger 3 enters the exhaust 26 and is delivered, via line 25, to the intake 24 of the blower 19, to be further advanced via line 20, 31 and 21 into the intermediate space 18 to preheat the wall of chamber 10. The waste inside the chamber 10 is ignited with the three burners 45. The air for the combustion chamber 10 is supplied through the bottom dump plate 15 through self cleaning nozzles which per se are known in the art and therefore are not described in greater detail. Below the dump plate 15 is the sliding gate valve 14 which is also closed at this stage.

The processing within the chamber 10 is effected under so-called controlled air concept, wherein the incineration starves the air quantity in chamber 10 to obtain a partially oxidized effluent (800° to 1,100° F) consisting of CO, $CO_2$, $H_2$, $N_2$ and water vapour. This is accomplished by limiting the air flow through the plate 15 to about 30% of the air required for complete oxidization of the batch. The control of the temperature of the inside wall 16 of chamber 10 assists in this matter. A gentle air flow present within the chamber 10 pyrolizes the waste and leaves most of the ash (which becomes completely oxidized by the end of the cycle) in the primary chamber, namely in the region of the cone 12.

With the ignition of the waste, the pyrolisis reaction proceeds gradually throughout the waste bed. First, the moisture and volatile matter (partially oxidized) are driven from the waste leaving the fixed carbon in the waste for complete oxidation in the latter stages of the burning cycle.

The greatest volume change occurs in the initial stages when the volatiles are being driven off and partially oxidized. Half-way through the cycle, a 75% volume reduction has occurred with general waste as described above. The balance of the burned cycle is used to oxidize the fixed carbon content of the waste leaving the sterile radioactive ash.

The liquid waste is injected into the unit through the waste oil inlet 46 approximately 4 hours into the cycle after the solid waste level has receded several feet below the liquid waste injection inlet 46. The waste is injected for 3 hours at a rate of five imperial gallons per hour. The waste in injected in the form of droplets (not finally atomized) through the starved air atmosphere to the hot waste bed. The liquid quickly evaporates and then the fixed carbon residue is oxidized along with the fixed carbon in the solid waste.

The partially oxidized effluent with a very small amount of particulate is completely burned in the afterburner 2 where additional air (with an excess of 100%) and fuel is introduced to complete the oxidization. The afterburning operating temperature is 1600° to 1800° F.

It was found that controlled air burning with a proper afterburner produces an effluent with particles in the range of 0.05 grains per standard cubic foot in the after burner exhaust 70. This is sufficient to meet most environmental regulations considering only particulate omission. However, the particulates from radioactive waste usually contain a level of radioactivity that warrants further clean-up. The effluent passing through the exhaust 70 is cooled down in the heat exchanger 3 to bring the temperature of same to a safe level with respect to the maximum temperature at which the filters in the back house 4 can operate. It is to be appreciated that the after burner 2 ignites and burns the partially oxidized effluent from the chamber 10 at a temperature of 1800° F. for half a second. The burner 59 is sized for one Mbtu/hr. required at start-up and is modulated by a temperature controller (not shown) to maintain the 1800° F. outlet temperature at the exhaust 70. Normally the burner 59 runs at approximately 200,000 btu/hr. Additional oxygen introduced into the afterburner through the openings 33 assists in completion of the combustion of the waste.

As mentioned before, the afterburner 2 is a double shell construction with an inner refractory lining 44. Cooling air passing through the space 41 reduces the outer shell temperature and, in effect, reduces the thickness of the refractory 44, thus reducing the built-up radioactivity. The lining 44 is replaceable. The effluent passes from the exhaust 70 and is reduced in temperature from the above-mentioned 1800° F. to approximately 400° at the outlet 71 of the heat exchanger 3. The temperature of approximately 400° F. at this point is selected to keep the effluent temperature above the dew temperature. The heat exchanger 3 is cooled by air supplied by a blower 72 through a line 73 provided with suitably located valves 74, 75. The air exhaust 26 of the exchanger communicates, through line 76, with the stack 6 when not used for heating the inner shell of the chamber 10 by returning the exhaust air back to the air blower 19 via line 25 as described hereinabove. Communicating with the line 76 is one end of connecting line 77, the opposite end of which communicates with an outlet 78 of the cooling air used in the after burner 2.

The bag house 4 for clean-up of the radioactive particles has a low air-to-cloth ratio due to the light particulate load. It is of a known structure and is selected to be capable of operating many days before dust removal by shaking of its filters is required. The back filters of the back house are made of untreaded glass pre-coated with aspestos fibers.

The incineration system of the present invention operates on a time sequence with safety interlocks to assure proper operation. The unit is capable of being provided with a remote control by tying temperatures, pressures, pressure drops and valve position into a centralized control system, the control system per se consists of well known integers which therefore do not have to be described in a detail.

The sequence of operation is apparent from the following schedule covering a 20 hour cycle. The main points of this cycle are:

| CYCLE IN HR:MIN. | FUNCTION |
| --- | --- |
| 0:00 to 0:50 | Prepurge after burner ignition & system warm-up. |
| 0:50 to 1:20 | Waste Ignition. |
| 1:20 to 10:00 | Waste Burning. |
| 5:20 to 8:20 | Liquid Waste injection. |

| CYCLE IN HR:MIN. | FUNCTION |
| --- | --- |
| 10:00 to 14:00 | Start cool down with after burner on, combustion air and shell cooling air. |
| 14:00 to 18:30 | Cool down with combustion air fan, and shell cooling air. |
| 18:30 to 19:05 | Cool down with shell cooling air, unit ready for clean-out and loading. |

It will be appreciated that the present invention provides an incinerator suitable for low level radioactive trash, refuse and discards, reducing the volume of such refuse by 90% with virtually complete safety. This is achieved by, firstly, providing the combustion chamber 10 with smooth, stainless steel inside walls 16 in combination with replaceable cone 12 provided with a refractory lining 7. In other words, the lining 7 which is subject to a build-up of radioactivity can relatively easily be replaced whereas the heat resistant steel portion can be cleaned. Furthermore, the present invention provides for an extremely efficient control of the temperature of the inside wall 16 in chamber 10, which is of advantage in effectively controlling the "controlled air" operation. The control is further assisted in selective introduction of pure hot air leaving the heat exchanger 3 at the exhaust 26, to the intake 24 of the blower 19.

Those skilled in the art will readily conceive various departures from the above described embodiment of the present invention. It is to be appreciated, however, that the above disclosure refers to a preferred embodiment only and that different embodiments from that shown exist which do not depart from the scope of the present invention as defined in the accompanying claims.

The embodiments of the invention in which an exclusive property or privilege is claimed are defined as follows:

1. A waste incinerator system for incinerating a batch of solid waste, said system including a combustion chamber having flue outlet means including an afterburner, said combustion chamber being of the type of an upright, generally cylindrical vessel having a heat resistant steel inner shell and a metal outer shell, said shells being arranged in a concentric fashion to provide an intermediate space for passage of temperature control air,
   (a) the lower end of said combustion chamber being detachably secured to a downwardly converging frusto-conical bottom section the lower end of which terminates at an ash outlet;
   (b) means for introducing temperature control air into said intermediate space; and
   (c) means for discharging said air from said intermediate space, said means for discharging said air from said intermediate space being arranged for discharging the air into said flue outlet means.

2. A system as claimed in claim 1 wherein said means for introducing temperature control air into said intermediate space is disposed at at least two different levels vertically spaced from each other, to selectively control the temperature of said shells.

3. A system as claimed in claim 1 wherein said means for introducing the temperature control air into said intermediate space includes means for introducing air into said flue outlet means.

4. A system as claimed in claim 3, wherein said afterburner is of the type of the double-shell combustion chamber with a cooling air passage between the shells thereof, the passage being separate from said intermediate space and being operatively associated with said means for introducing the temperature control air into said intermediate space.

5. A system as claimed in claim 1, wherein said inner shell of the upright cylindrical vessel forms the inside wall of the vessel, while the inside wall of said frusto-conical bottom section is formed by a shell lined with refractory.

6. A system as claimed in claim 2, wherein said means for introducing the temperature control air into said intermediate space is an air blower, the discharge end of which is arranged to selectively communicate with a first annular air chamber located at a lower portion of said frusto-conical bottom section and communicating with said intermediate space of the frustoconical portion; and a second annular air chamber surrounding the bottom portion of said upright cylindrical vessel near the joinder thereof with said frusto-conical bottom section, said second annular air chamber communicating with said intermediate space of said upright cylindrical vessel, the intermediate space of said frusto-conical bottom section being arranged to communicate with the intermediate space of said upright, generally cylindrical vessel.

7. A system as claimed in claim 6, wherein said upright, generally cylindrical vessel is provided with burners located in a generally horizontal level, equidistantly spaced about the periphery of said chamber and directed generally radially with respect to the upright axis of the vessel, the level at which said burners are located being disposed between said flue outlet and the uppermost part of said frusto-conical bottom section.

8. A system as claimed in claim 1, further comprising waste oil injection means passing through the wall of said vessel and located above the level in which said burners are located.

9. A system as claimed in claim 1, further comprising flue gas cooling air supply means operatively connected to a flue gas cooling heat exchanger located downstream of said afterburner and upstream of a filter means, said filter means being located upstream of a stack of said system, said heat exchanger including a cooling air exhaust adapted to selectively communicate with a stack and/or with intake of an air blower of said means for introducing the temperature control air, said blower also being provided with means for supplying ambient air to the intake thereof.

* * * * *